United States Patent [19]

Mueller et al.

[11] 3,934,821

[45] Jan. 27, 1976

[54] BULK COOLER AND STORAGE TANK

[75] Inventors: Paul Mueller; Robert B. Cannon; Ray A. Prine, all of Springfield, Mo.

[73] Assignee: Paul Mueller Company, Springfield, Mo.

[22] Filed: May 6, 1974

[21] Appl. No.: 466,968

[52] U.S. Cl. ............................................. 239/224
[51] Int. Cl.² ... B05B 3/10; B44D 5/10; F23D 11/04
[58] Field of Search ..................... 239/224, 223, 15

[56] References Cited
UNITED STATES PATENTS

| | | | |
|---|---|---|---|
| 2,975,755 | 3/1961 | Reindl | 239/223 |
| 3,358,931 | 12/1967 | Wirth | 239/224 |
| 3,442,688 | 5/1969 | Pettigrew | 239/224 |

Primary Examiner—Lloyd L. King
Attorney, Agent, or Firm—Rogers, Ezell & Eilers

[57] ABSTRACT

A bulk tank cooling and storage apparatus has heat exchange surfaces substantially covering the side and end walls of the tank. The tank is supplied with a horizontal rotating disc liquid distributor which uniformly distributes the liquid in a sheet over the heat exchange surfaces so that it flows downwardly over the surfaces in a thin film and is cooled by heat exchange operating in cooperation with the heat exchange surfaces. Even distribution of the liquid is provided by the rotating disc distributor which expels liquid from the periphery of the rotating disc and propels the liquid against the walls of the tank. Liquid fed into the tank is directed to the center of the rotating disc where a cylindrical dam or well holds a reservoir of the liquid and distributes it on the surface of the disc. The periphery of the disc may have a knife edge which helps the film of liquid to flow off smoothly without atomization.

11 Claims, 9 Drawing Figures

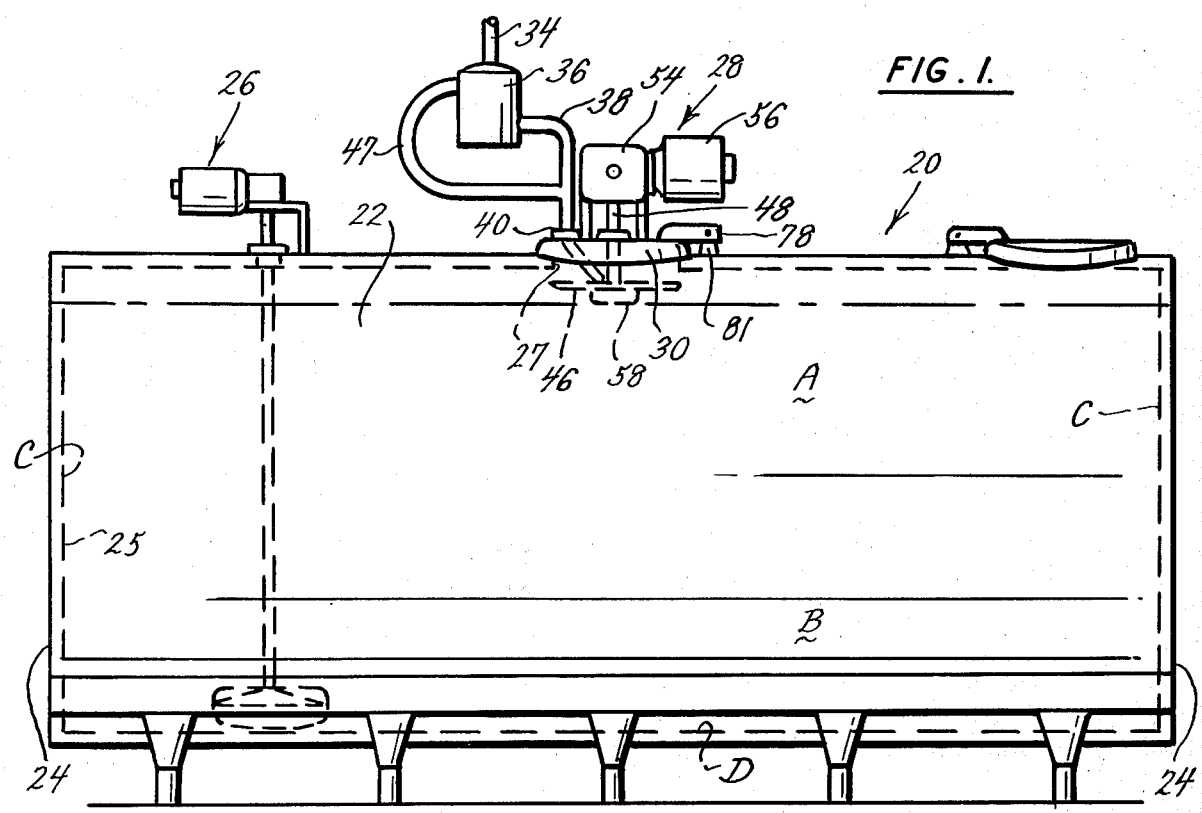
FIG. 1.
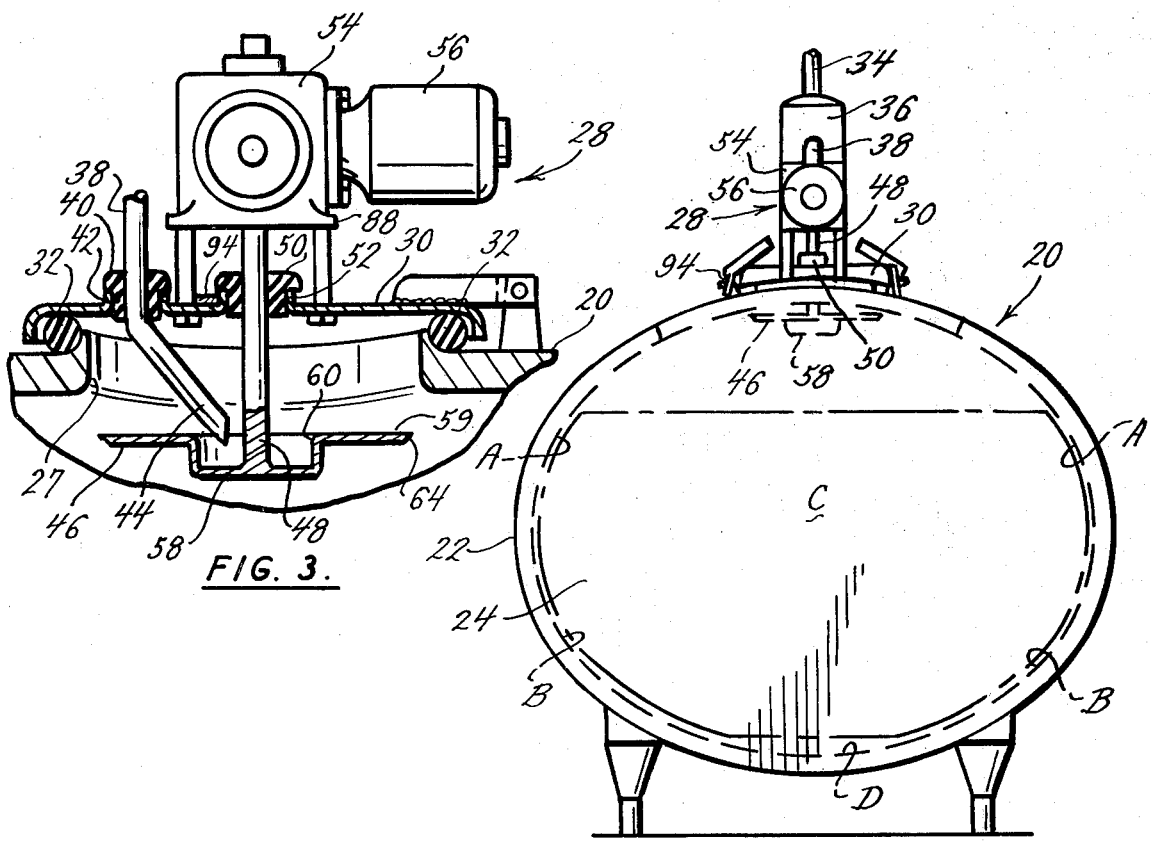
FIG. 3.
FIG. 2.

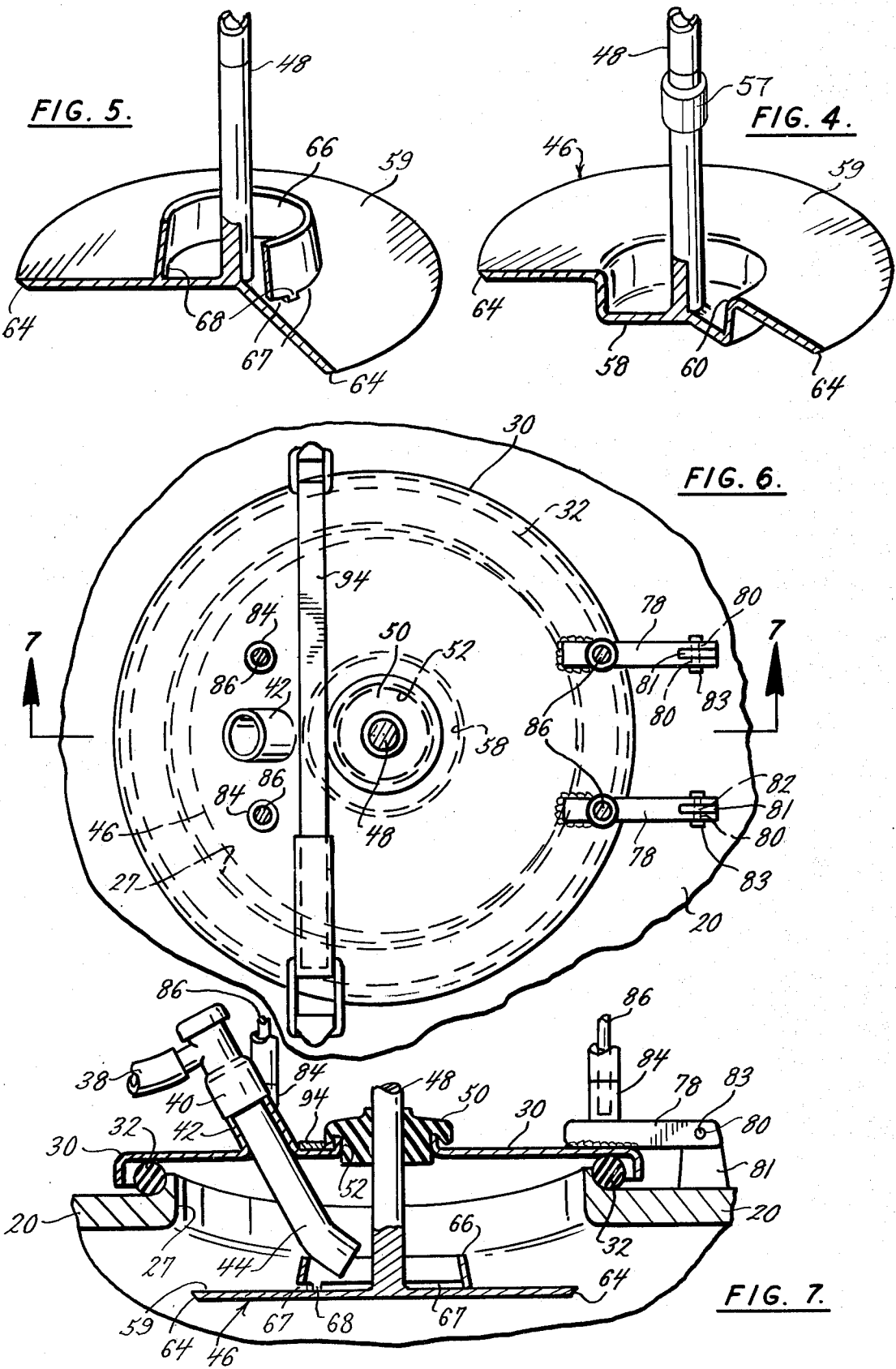

BULK COOLER AND STORAGE TANK

BACKGROUND AND SUMMARY OF THE INVENTION

Perishable liquids, such as milk and other foods, are typically stored in large tanks. These tanks are provided with heat exchange surfaces in the interior or in the lower portions of the walls of the tanks. The liquid, e.g., milk, is added to the tank and cooled by exposure to the heat exchange to a temperature below that at which significant decomposition and bacterial action takes place. In the case of milk, it is typically stored at a temperature range between slightly above freezing, about 33° F., to below about 40° F. A mean temperature of 37° F. would be typical.

Bulk storage and cooling tanks for milk are found commonly on large dairy farms where the milk is produced. The milk is collected by a bulk truck from the tanks, usually every other day. This means that the tank must be sufficiently large to store and cool 2 days' milk production or the milk produced in four milkings. This creates a number of problems since the milk stored in the tank previously will be at a stable temperature below 40° F. and the milk introduced into the tank in subsequent milkings will be introduced at a temperature near 98° F., the body temperature of the cow. Usually there is some temperature drop in the inlet line so the milk would enter the tank at approximately 90° F. It has been claimed that the quality and shelf life of fluid milk is improved when the incoming milk is cooled before mixing with the milk already in the tank.

In an effort to gain this quality and shelf life improvement, some regulatory agencies have required that some form of precooling equipment be used to cool the milk prior to introducing it into the tank of previously cooled milk. These pre-coolers typically take the form of tubular or plate type heat exchangers, placed upstream of the bulk tank. The precoolers lower the temperature of the milk to below 40°F. prior to introducing it into the tank. Due to the periodic nature of milking, the heat exchange capacity of these devices must be quite high during the short time in which they are used; they remain unused for the major portion of the day. To level out the heat duty on the pre-coolers, they are normally used in conjunction with refrigeration equipment such as water chillers or ice makers which can supply heat exchange capacity by acting as a heat sink during the period of demand upon the equipment. All of this heat exchange equipment, however, takes up considerable valuable space, is costly to purchase and to maintain, is difficult to clean and keep in sanitary condition and may create excess pressure drop and shear which damages the milk.

Applicant has invented a device which eliminates the necessity for pre-coolers stationed in line upstream of bulk milk storage tanks and tanks for storing other perishable liquids. The device reduces the temperature of incoming liquid prior to mixing with the stored mass. The equipment is contained within the tank, easily cleaned, small, inexpensive to purchase and operate, has a very low maintenance, and has very efficient heat transfer. The device rapidly cools the incoming liquid without subjecting it to severe mechanical action which, in the case of milk particularly, may damage it or reduce its quality.

Applicant has devised a method of rapidly cooling perishable liquids on introduction into bulk storage without mixing the incoming warm liquid with the bulk of the cooled liquid in the storage tank. The temperature of the liquid introduced into the tank is rapidly reduced to a stable temperature and the temperature of the mass of liquid stored in the tank never gets above a stable temperature locally and in the mass. In particular for milk, the temperature of milk stored from previous milkings in bulk storage is maintained below 40°F. even when fresh milk is added at each additional milking.

Applicant's device and method use a horizontally disposed spinning disc located at the top of a bulk storage tank to distribute liquid in a film over the surfaces of the tank walls and ends. The heat exchange in the tank is placed in the walls and ends of the tank, not only in the lower portions of the tank, but throughout the walls and ends up to the top of the tank. The liquid is introduced on the rotating disc which propels the liquid in a thin stream off the periphery of the disc onto the upper portions of the tank walls and ends. The liquid flows down the walls and ends in a thin film over the heat exchange surfaces. The thin film provides a very efficient transfer of heat from the liquid into the heat exchange medium and effects an extremely rapid cooling of the liquid as it flows down the walls. The liquid stored in the tank is maintained by the heat exchange in the lower portion of the tank at a stable temperature. As the tank fills up with each addition of new liquid, the cooling of the liquid on the heat exchange surfaces in the upper portions of the tank is sufficient, when combined with the sensible heat of the stored liquid, to insure that the temperature of the mass of liquid stored in the tank never rises above a stable temperature.

DESCRIPTION OF THE DRAWINGS

FIG. 1 is a side view of a bulk milk storage tank incorporating the device of the invention;

FIG. 2 is an end view of the tank of FIG. 1;

FIG. 3 is a partial sectional view of the milk tank of FIG. 1, showing the disc distributor device;

FIG. 4 is an isometric view in partial section of the disc in FIG. 3;

FIG. 5 is an isometric view in partial section of an alternative disc;

FIG. 6 is a top view of the manhole cover for mounting the disc;

FIG. 7 is a partial sectional view of the manhole cover and tank showing the alternative disc and an alternative milk inlet;

DESCRIPTION OF THE PREFERRED EMBODIMENTS

Figure 9:
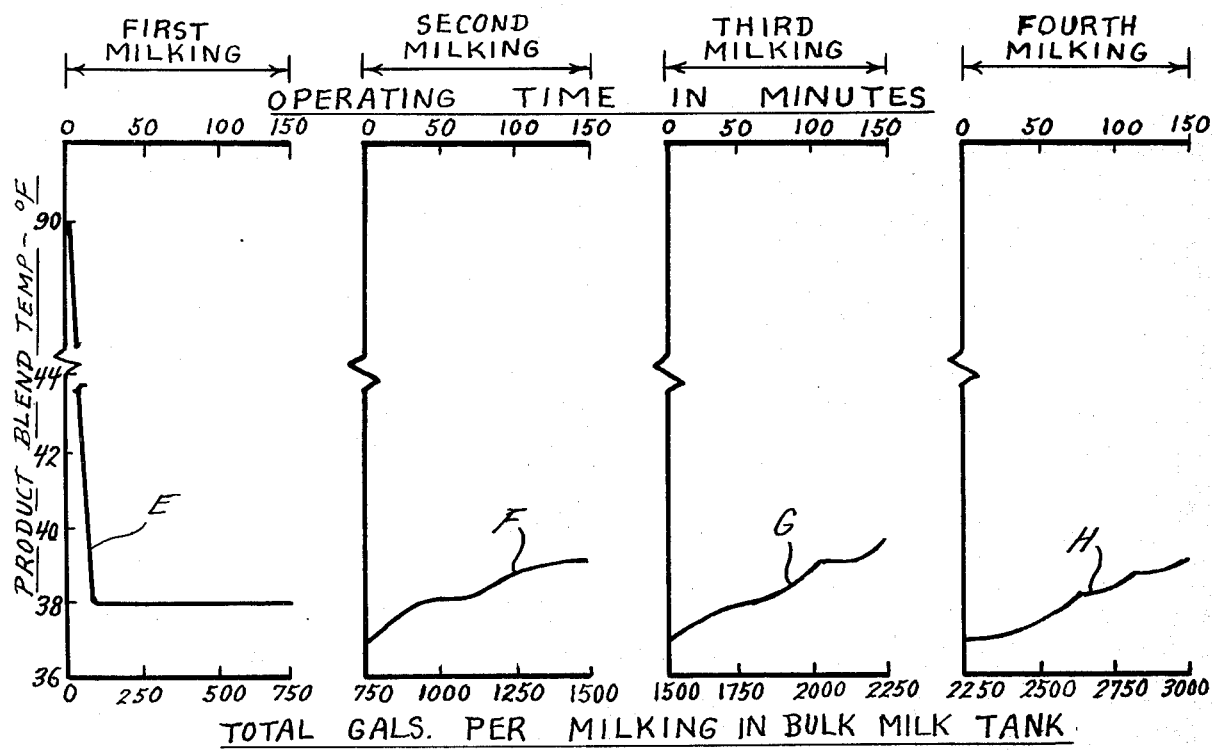
FIG. 9 is a chart showing the temperature of milk stored in a 3,000 gallon bulk milk storage tank during addition of milk from four separate milkings.

Referring in more detail to the drawings, particularly FIG. 1, a bulk liquid storage tank 20 is shown having side walls 22 and ends 24 incorporating heat exchange surfaces 25. An agitation mechanism shown at 26 may be included in the tank to improve heat transfer. The tank 20 has a central manhole 27 in which the milk distribution apparatus 28 is located. The milk distribution apparatus 28, shown in more detail in FIG. 3, consists of a manhole cover 30 having a gasket 32 which fits over the manhole 27 and forms a tight sanitary seal. A liquid inlet line 34 is attached to a balance tank or surge tank 36. The line 38 from the balance tank 36 passes through a seal 40 in an orifice 42 in the manhole cover 30 and terminates at a pipe 44 in the interior of the tank 20. The pipe 44 terminates just above a horizontal disc 46. Relief line 47 joins the upper portion of tank 36 and line 38.

The disc 46 is attached to a vertical shaft 48, which passes upwardly through a rubber seal 50 in an orifice 52 in the manhole cover 30. The shaft 48 is rotated by a gear reducer 54 and electric motor 56. If desired, an insulating coupling 57, may be provided between shaft 48 and gear reducer 54 to thermally insolate the disc 46 from the heat generated by gear reducer 54, since the heat may increase the temperature of the milk.

Concentric to the shaft 48 is a circular well 58 which is recessed in the upper surface 59 of the disc 46. The well 58 surrounds the inlet pipe 44. The well 58 has a rounded shoulder 60 which allows the liquid to flow evenly onto the upper surface 59 of disc 46. The periphery of the disc 46 may have a knife edge or taper at 64 (shown in FIG. 4) which helps the liquid to flow evenly off the periphery of the rotating disc without atomization and helps maintain a stream of liquid flowing toward the walls of the tank.

FIG. 5 shows an alternative embodiment of the disc 46 utilizing a vertical wall 66 in the center of the disc, instead of the well 58, to distribute the liquid onto the upper surface of the disc 46 via slot 67. Slot 67 is formed by spacing vertical wall 66 from the surface 59 of the disc 46 with welded pads 68. The slot 67 is preferably between about 1 to 3 millimeters in height. A third alternative, not shown, is to place the inlet pipe 44 at a location to supply the liquid onto the rotating shaft 48 at a location spaced above the upper surface of the disc 46. The liquid spirals down the shaft 48 during rotation and is evenly distributed on the upper surface of the disc 46. This embodiment is somewhat more difficult to adjust and maintain, but it does provide effective distribution of the liquid onto the disc 46.

Figure 8:
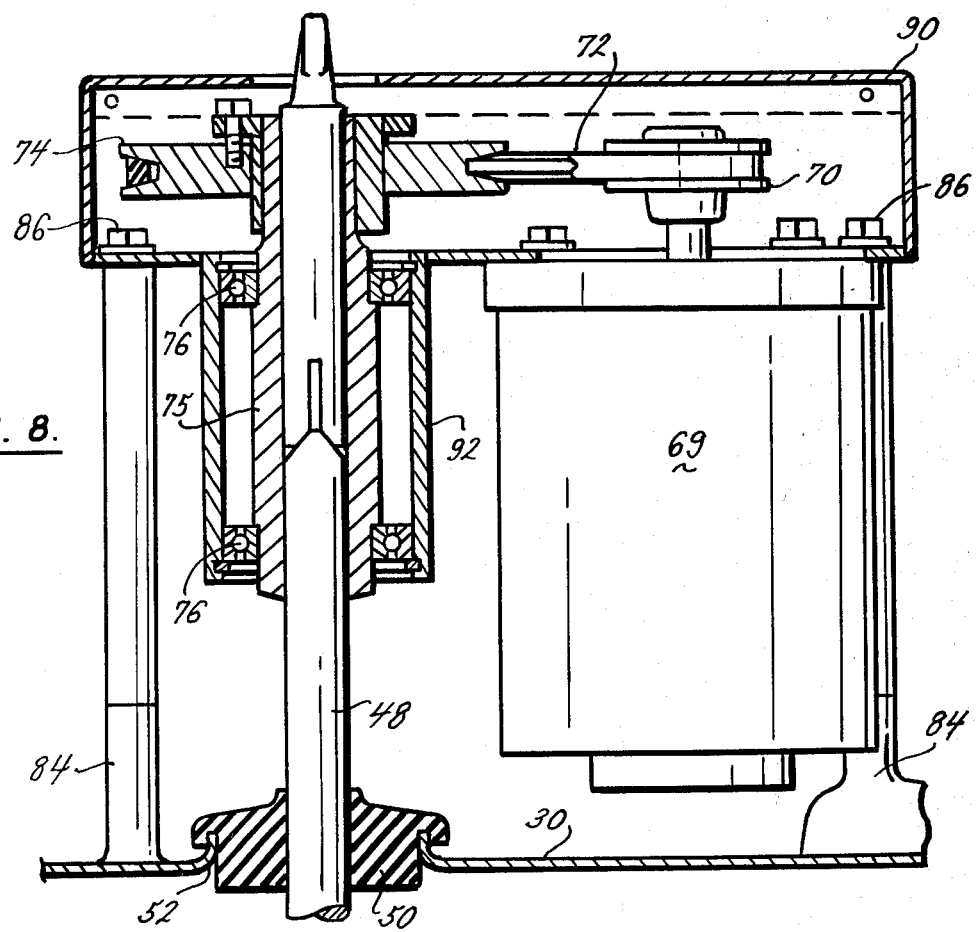
FIG. 8 is an alternative drive mechanism for rotating the disc.

FIG. 8 shows an alternative drive mechanism, for rotating the disc 46 via the shaft 48. In the alternative drive mechansim an electric motor 69 drives a sheave 70 and through a belt 72 drives a sheave 74. The sheave 74 is attached to a rotating quill 75 mounted on a pair of spaced bearings 76. The rotating quill 75 drives the shaft 48 extending through the rubber seal 50 in the orifice 52 in the manhole cover 30.

The manhole cover 30 is mounted to the top of the tank 20 by a pair of spaced lugs 78 having holes 80 which cooperate with corresponding lugs 81, and holes 82 on the upper surface of the tank 20 to receive hinge pin 83. The cover 30 may be pivoted into and out of a covering relationship with the manhole 27. The disc 46 and disc drive mechanism is mounted to the manhole cover 30 and pivots into and out of the manhole 27 when the cover 30 is pivoted into and out of a covering relationship with the manhole 27. A set of mounts 84 on the cover 30 receive a set of mounting bolts 86 which extend through mounting plate 88 of gear reducer 54 and motor 56 or through the motor-quill housing 90, 92. A strap 94 holds the manhole cover 30 in a closed position when the distributor 28 is in operation.

The disc 46 is normally placed in the upper part of the tank 20 at a location between 1 to 1½ inches of the top of the tank. The disc 46 is sufficiently large that it will carry a significant volume of liquid in a thin film distributed about its upper surface. Typically the disc 46 will be from 15 to 20 inches in diameter. The well 58 or the dam 66 will be of sufficient size to hold a substantial volume of liquid for distributing on the upper surface of disc 46. Typically the well 58 and the dam 66 will be from 3 to 6 inches in diameter and from 1 to 3 inches in heighth or depth. The dam 66, if used, will be tapered slightly inwardly at the top to resist the tendency of the liquid to climb the walls of the dam during rotation of the disc. The slit 67 will be sufficiently large that the volume of milk will flow outwardly under the influence of the head of milk held in the dam 66, but is sufficiently small to effectively distribute the milk evenly over the upper surface of the disc 46. Typically the slit 67 will be from 1 to 3 millimeters in height.

In operation of the bulk milk cooler during milking, as shown in the drawings, milk is received from the milking line 34 shown into the balance tank 36 to smooth out the surges and supply inertia to the system. The milk then flows relatively evenly out of the balance tank 36 through the pipe 38 and into the bulk milk tank 20 and out the outlet pipe 44 onto the rotating disc 46. The disc 46 is driven at a rotational speed of between about 300–550 rpm, depending on the tank and disc size, by the shaft 48 attached to the gear reducer 54 and the motor 56 or the sheave 74. The outlet pipe 44 terminates inside the well 58 so that a pool of liquid is built up in the interior of the well 58 and passes outwardly over rounded shoulder 60 to form a thin film on the upper surface of the rotating disc 46. The thin film passes outwardly under the influence of the centrifugal force generated by the rotating disc 46 and flows off the knife-edge periphery 64 of the disc. The knife edge aids in expelling the liquid from the periphery of the disc 46 as a stream of liquid so that it is not atomized. Atomization should be carefully avoided since it tends to entrain air into the liquid. Entrained air is a disadvantage in cooling milk since oxygen in the air tends to react with the butterfat in the milk and produce rancidity. It the disc shown in FIG. 5 is used, milk is introduced from the outlet pipe 44 into the interior of concentric dam 66 in the center of the spinning disc 46 and under influence of the rotation of the disc, flows outwardly underneath the dam 66 through the slot 67 onto the upper surface of the disc 46 and forms a smooth even film over the surface of the disc which is expelled from the periphery 64 to the walls of the tank 20.

The liquid or milk is propelled from the disc 46, follows a normal trajectory in a generally horizontal direction to the walls and ends 22, 24 of the tank 20 and flows down the interior surfaces of the bulk tank which contain heat exchange 25, shown in FIGS. 1 and 2 as being in four separate zones A, B, C and D, and flows down the walls in a thin film, subject to the influence of the heat exchange. The heat exchange zones, A, B, C and D, extend substantially to the top of the tank, as shown in FIGS. 1 and 2, so that the liquid is under the influence of heat exchange 25 at all levels of the tank.

FIG. 9 shows the graphical results of an acutal test performed with a 3,000 gallon tank equipped with four zones of heat exchange and with the liquid distributor of the invention. The test was conducted through four cycles over a period of 2 days. Water, simulating milk, was introduced into the tank at 90°F. and reduced to a temperature below 40°F. and held at that temperature for up to 2 days. As shown by curve E at the far left side of FIG. 10, the temperature of the liquid introduced into the bulk tank dropped rapidly to 38°F. as a result of the heat exchanged in flowing over the surfaces of the zones A, B, C and D of the walls 22, 24 of the tank 20. This temperature was held throughout a cycle of 2½ hours (150 minutes), a normal milking cycle, and a total of 750 gallons of liquid was added during the first cycle.

As shown by curve F, by the beginning of the second cycle, 12 hours after the start of the first cycle, the temperature of the liquid in storage was cooled down to 37°F. At the beginning of the second cycle, liquid was again introduced into the tank and distributed over the cooling surfaces. The liquid temperature in the tank began to rise as a result of the addition of the liquid during the second period, but never rose above 39°F. by the end of the second cycle. At the end of the second cycle a total of 1,500 gallons of liquid was present in the tank.

As shown by curve G, the temperature of the liquid in the tank was reduced to 37°F. by the beginning of the third cycle, 12 hours later. Liquid was again introduced into the tank and cooled by flowing over the heat exchange surfaces of the tank. The temperature of the bulk of liquid in the tank rose during the third cycle from 37°F to 39½°F. by the end of the third cycle. At the end of the third cycle, a total of 2,250 gallons of liquid was in the tank.

As shown by curve H, the temperature of liquid in the tank was again reduced to 37°F. by the beginning of the fourth cycle, 12 hours later. Liquid was again introduced into the tank and the temperature rose to 39°F. at the end of the cycle, at which time 3,000 gallons of liquid had been stored in the tank without ever having been heated to a temperature of above 40°F.

As shown by the tests illustrated in FIG. 9, applicant's cooling device and method is able to effectively cool large volumes of perishable liquids and blend warm fresh liquid into stored liquid without raising the temperature of the mass of liquid to an unstable or unsafe level. Applicant's device accomplishes this result without expensive and bulky pre-coolers and in a compact and easily cleaned structure.

It will be appreciated by one skilled in the art that various changes or modifications may be made in addition to those described herein without departing from the scope of the claimed invention. It is intended that all matter described in the foregoing specification shall be interpreted as being for purposes of illustration and not as limiting the invention claimed.

We claim:

1. A device for distributing a liquid having a horizontally disposed disc, means to rotate the disc about a vertical axis, means for supplying a liquid to the upper surface of the disc, means for uniformly distributing the liquid on the upper surface of the disc, and means to isolate the distributing means from mechanically generated heat.

2. The device of claim 1 wherein the means for supplying the liquid is a circular wall spaced inwardly from the periphery of the disc and concentric to the axis of rotation, and the means for uniformly distributing the liquid is a slot at the base of the wall.

3. The device of claim 2 wherein the wall slot is between about 1 to 3 millimeters in height and the wall extends upwardly for between about 1 to 3 inches.

4. The device of claim 1 wherein the means for uniformly distributing the liquid is a recessed well in the upper surface of the disc, the well being spaced inwardly from the periphery of the disc and concentric to the axis of rotation.

5. The device of claim 4 wherein the recessed well is between about 1 to 3 inches deep and between about 3 to 6 inches in diameter.

6. The device of claim 1 wherein the means for rotating the disc is a vertical shaft attached to the center of the disc and extending upwardly from the upper surface of the disc.

7. The device of claim 1 wherein the means for uniformly distributing the liquid distributes the liquid in a thin film on the upper surface of the disc.

8. The device of claim 1 wherein the disc is a thin edge at its periphery.

9. A method of forming a uniform distribution of a liquid to be cooled comprising rotating a disc about a vertical axis, supplying the liquid to the upper surface of the rotating disc, distributing the liquid uniformly over the surface of the disc, and discharging the liquid from the periphery of the disc in a substanially non-atomized stream.

10. The method of claim 9 wherein the disc is rotated between about 300–550 rpm.

11. The device of claim 1 wherein the means for uniformly distributing the liquid is a flat bottomed recessed well in the upper surface of the disc, the well being between 1 to 3 inches deep and between 3 to 6 inches in diameter, the wall of the well being substantially perpendicular to the upper surface of the disc and having a rounded shoulder between the wall of the well and the upper surface of the disc, the means for rotating the disc being a vertical shaft attached to the center of the recessed well and extending upwardly from the upper surface of the disc, and the means to isolate the distributing means from mechanically generated heat being an insulating coupling on the shaft.

* * * * *